M. H. ASCHNER.
NUMBER ILLUMINATING DEVICE FOR MOTOR VEHICLES.
APPLICATION FILED OCT. 22, 1917.
1,274,838.
Patented Aug. 6, 1918.
2 SHEETS—SHEET 1.
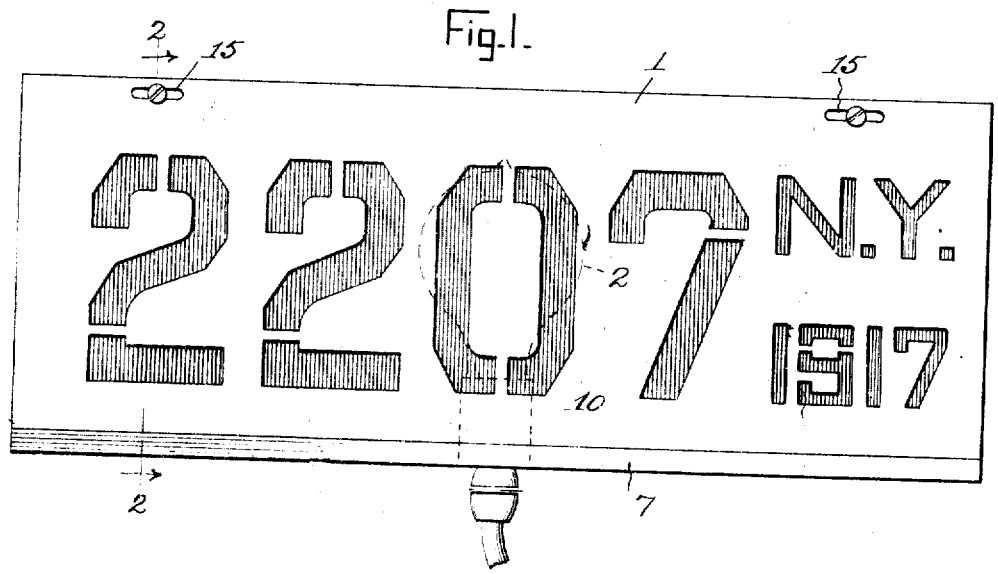
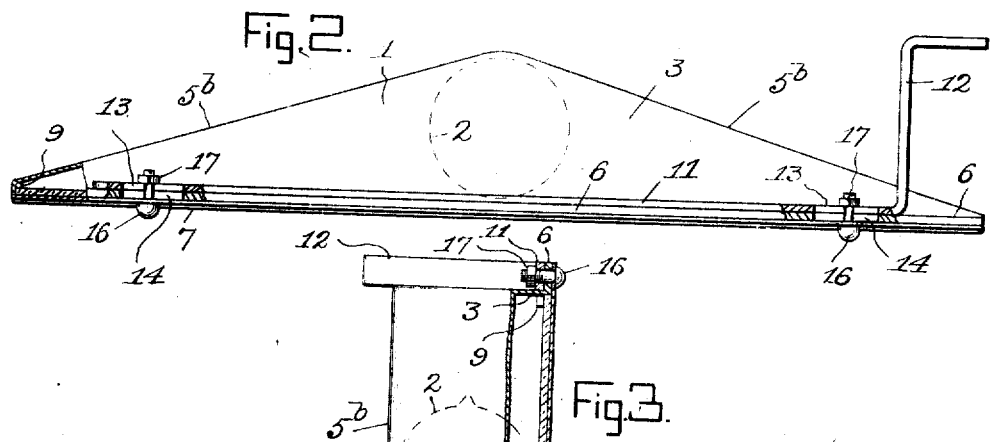
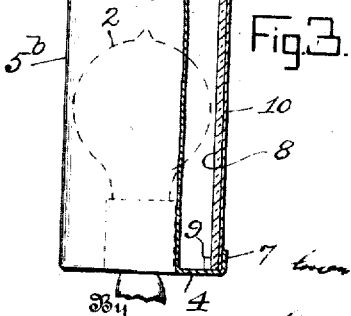

M. H. ASCHNER.
NUMBER ILLUMINATING DEVICE FOR MOTOR VEHICLES.
APPLICATION FILED OCT. 22, 1917.
1,274,838.
Patented Aug. 6, 1918.
2 SHEETS—SHEET 2.
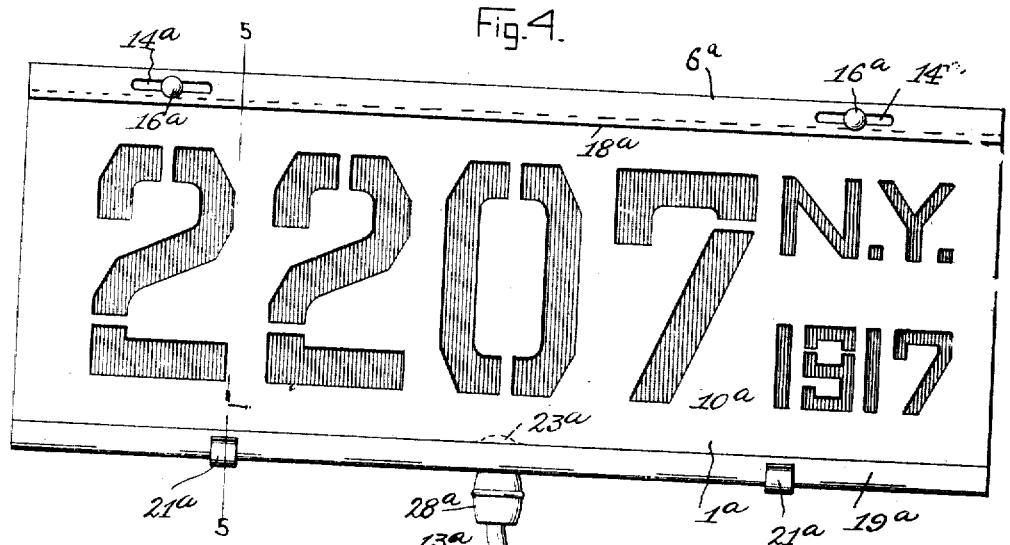
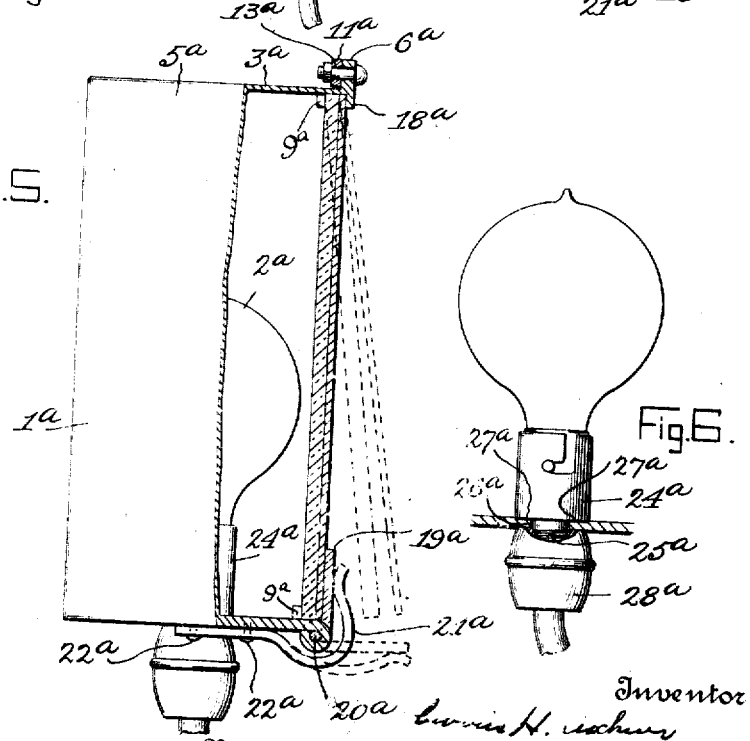

UNITED STATES PATENT OFFICE.

MORRIS H. ASCHNER, OF LONG ISLAND, NEW YORK.

NUMBER-ILLUMINATING DEVICE FOR MOTOR-VEHICLES.

1,274,838.

Specification of Letters Patent.

Patented Aug. 6, 1918.

Application filed October 22, 1917. Serial No. 197,844.

*To all whom it may concern:*

Be it known that I, MORRIS H. ASCHNER, a citizen of the United States, residing at Long Island, in the county of Queens and State of New York, have invented new and useful Improvements in Number-Illuminating Devices for Motor-Vehicles, of which the following is a specification.

The present invention relates to holders and display devices for automobile license plates, wherein the license plate may be illuminated for night service and readable at comparatively great distances.

The invention has for its main object the provision of a device, of the above mentioned character, possessing novel features of construction which permit the license plate to be applied and secured in position with the greatest possible ease and celerity, and which produces a simple, compact construction, illuminating numerous small parts, and minimizing workmanship in manufacture, thus rendering the device of great commercial value.

The invention further comprises and resides in sundry novel features and details of construction which will be readily apparent from the following description and the drawings illustrating the embodiments of the invention.

In the drawings which clearly describe the invention:

Figure 1 is a front elevation of one embodiment,

Fig. 2 is a top plan view of Fig. 1,

Fig. 3 is a vertical sectional view taken on line 2—2 of Fig. 1, and looking in the direction of the arrows, Fig. 4 is a front elevation of another embodiment of the invention, and Fig. 5 is a vertical sectional view taken on line 5—5 of Fig. 4.

Fig. 6 is a detail view showing the lamp, its socket, and the leading-in wire.

Like characters denote similar parts throughout the specification and drawings.

In carrying the present invention into practice, a casing 1 is provided to house a lamp 2, the casing comprising top and bottom walls 3 and 4 and a rear wall 5 secured to the edges of the top and bottom walls. The rear wall 5 is bent at its central portion to form diverging side wall portions 5ª, which act as means for reflecting the rays from the lamp 2.

It will be noticed from the drawings that the diverging wall portions 5ª extend forwardly to the front edges of the top and bottom walls 3 and 4, the lamp 2 being positioned in the casing opposite the central portion of the rear wall 5, as clearly shown.

The front of the casing is to be closed or covered by a transparent sheet of material 8, such as glass, which is cut to snugly fit between the top, bottom and side-wall portions of the casing 1, there being, preferably, shoulders, such as indicated at 9, adjacent the forward corners of the casing to limit the inward movement of the transparent plate 8 and to assist in maintaining it in position.

In the embodiment shown in Figs. 1 to 3, it will be seen that the front edge of the top and bottom walls are provided with upstanding flanges 6 and 7, respectively, the front edge of the bottom wall 4 of the casing being slightly in advance of the front edge of the wall 3 in order that the flange 7 will lie out of alinement with the flange 6 for providing a space or groove between the flange 7 and the plate 8, in which groove the lower edge of the license plate 10 may be inserted and rest. This groove or space may be provided in any other suitable manner that may be found desirable or practicable.

The casing 1 and the license plate 10 are thus secured to the ordinary brackets used for supporting the usual license plate. One of these brackets has been shown in the drawings, and comprises an elongated arm 11 having one end offset, as indicated at 12, to be suitably secured to the vehicle and having elongated slots 13 adjacent its ends.

To provide for the ready and quick attachment of both the casing and license plate to the bracket arm, the plate 10 and flange 6 are provided with horizontal elongated slots 14 and 15, respectively, which are to register with the slots 13 in the bracket arm 11, through which slots 13, 14 and 15 a bolt 16 is passed and receives a securing nut 17 on its extended end.

Thus, it will be clear that this connection permits the parts to be quickly and readily attached and detached from the bracket arm, and eliminates various complicated constructions which have been heretofore found objectionable both from mechanical and commercial points of view; the aim of this invention being to simplify the construction, yet providing means for effectively securing the parts, and permitting their attachment, detachment and replacement with the greatest celerity and ease. It will be understood that the elongated slots 13, 14 and 15 will also permit the various parts to be shifted relative to each other to obtain fine adjustments which may be found desirable.

It will also be noticed that when the license plate has been secured in position, as shown in Fig. 3, it lies in apposition with respect to the transparent plate 8, and retains the latter firmly against removal and rattle.

The license plate 10 takes a stencil-like construction, that is, the numbers or characters thereon are formed by cutting out portions of the plate in order to permit the rays of light within the casing 1 to emit therethrough.

In the embodiment shown in Figs. 4 and 5, it will be noticed that the invention takes the same general construction as in the former embodiment, with the exception of the means for retaining the license plate in position which has been modified. Like parts shown in this latter embodiment will be designated by numerals indicating similar parts in the previously described embodiment, although these numerals will be followed by the exponent "a" in order to distinguish the two embodiments. In the present instance, the front edge of the top wall $3^a$ is provided with an upstanding flange $6^a$ extending the length thereof as is shown in Figs. 1 and 3, this flange $6^a$ having the elongated slots $14^a$ which register with the slots $13^a$ in the bracket arm $11^a$, through which slots a securing bolt $16^a$ extends. Likewise, the casing $1^a$ is secured directly to the supporting bracket $11^a$, as in the former instance, and admits of the same ready attachment and detachment.

The license plate $10^a$ is secured in position, in the present construction, by providing a downwardly-extending flange $18^a$ on and coextensive with the front edge of the top wall $3^a$ of the casing, and by providing a co-extensive retaining flange $19^a$ on the front edge of the bottom wall $4^a$ of the casing. The flange $19^a$ is hinged in any suitable manner, as indicated at $20^a$, and is normally held in its operative position by the spring members $21^a$, preferably of the leaf-spring type, secured at one end to the under face of the bottom wall of the casing, as indicated at $22^a$. The other ends of the springs $21^a$ are bent around the hinged joint $20^a$ and are extended upwardly into engagement to the outer face of the flange $19^a$ to exert a yielding pressure thereagainst. These springs $21^a$ may be of any desired number and are evenly placed along the flange $19^a$ so that pressure exerted thereby will be evenly distributed throughout the flange.

When it is desired to secure the license plate $10^a$ in place, it is only necessary to swing the retaining flange $19^a$ on its pivot to a position indicated by dotted lines in Fig. 5, and to insert the upper edge of the license plate between the flange $18^a$ and the transparent plate $8^a$; then move the lower edge of the plate $10^a$ into the position shown in full lines in Fig. 5, whereupon the flange $19^a$ will snap into position to firmly retain the plates $8^a$ and $10^a$ in the casing. It will be observed that the plate $10^a$ lies in close juxta-relation with the plate 8 and will retain the same against removal and rattle. To facilitate the opening of the hinged flange $19^a$, a finger piece, as indicated at $23^a$, may be provided on an intermediate portion of the same.

In both embodiments of the invention, the lamp 2 which, preferably consists of an electric bulb, is secured in a socket $24^a$ having a reduced threaded extension $25^a$ which extends through an opening $26^a$ centrally formed in the bottom wall $4^a$ of the casing. The reduced portion $25^a$ provides shoulders $27^a$ which engage and rest upon the edges of the opening $26^a$, while said threaded extension has a retaining nut $28^a$ threaded thereon, which is adapted to bear on the opposite side of the opening $20^a$ to firmly secure the socket in position, and in such a manner as to provide a water-proof joint.

The foregoing clearly describes the invention; however, it is to be understood that certain changes in the specific construction, combination and arrangement of parts can be made which fall within the legitimate scope of the appended claims.

What I claim is:—

1. In a device of the character described, comprising a casing having an open face, upstanding flanges formed on the top and bottom edges of said open face, a translucent plate to fittingly engage between the edges of said open face, means for limiting the inward movement of said plate, whereby the plate is held to lie flush with the uppermost of said flanges, the lowermost of said flanges lying out of alinement and in advance of said uppermost flange to form a space between said plate and itself in which the lower edge of a license plate is to engage and rest, said uppermost flange having slots therein to register with slots on the license plate, and means to extend through said slots for securing the parts together.

2. In a device of the character described comprising a casing having an open face, an inwardly extending flange formed on one edge of said open face of the casing, an outwardly extending flange formed on another edge of said open face of the casing, a translucent plate to fittingly engage between the edges of the open face of the casing, means for limiting the inward movement of said plate whereby the latter is held to lie flush with the outwardly extending flange, the inwardly extending flange lying out of alinement and in advance of the outwardly extending flange to form a space between said plate and itself in which the lower edge of a license plate is to engage and rest, said outwardly extending flange having slots therein to register with the slots along an adjacent edge of the license plate, and means to extend through said slots for securing the outwardly extending flange and license plate together and to the usual bracket arm.

3. The combination with an elongated bracket arm having spaced slots therein, a casing having an open face, upstanding flanges on the top and bottom edges of said open face, the lowermost of said flanges extending out of alinement and in advance of the uppermost of said flanges and adapted to retain the lower edge of a license plate in engagement with the casing, the uppermost of said flanges having slots therein to register with the slots in the bracket arm and with the slots in the upper edge of the license plate, and a securing element extending through said slots for firmly retaining the parts in position.

4. A device of the character described, comprising a casing having an open face with an upstanding and a depending flange on the front upper edge of said open face, a hinged flange on the front lower edge of said face, said depending and hinged flanges being adapted to retain a license plate in the open face of the casing, means for limiting the inward movement of the license plate, and means for yieldingly holding the hinged flange in a normal retaining position, said upstanding flange having slots therein to register with the slots of a bracket arm and through which securing members pass.

5. In a device of the character described, comprising a casing having an open face, a rigid inwardly extending flange on one edge of the open face of the casing, a hinged flange on the opposite face of the casing, said flanges being adapted to retain a license plate in the open face of the casing, means for limiting the inward movement of the license plate, and means for yieldingly holding the hinged flange in operative retaining position.

6. In a device of the character described, comprising a casing having an open face with a depending flange on the upper front edge of the open face, a transparent plate fittingly engaged between the edges of the open face, means for limiting the inward movement of said plate, a hinged flange on the lower front edge of the open face of the casing, said flanges being adapted to have a license plate inserted between them and said transparent plate, and a spring member exerting a yielding pressure on said hinged flange to normally hold it in operative retaining position whereby the transparent and license plates are held in the casing.

In testimony whereof I have hereunto set my hand.

MORRIS H. ASCHNER.